United States Patent [19]

Ohsawa et al.

[11] Patent Number: 4,935,319
[45] Date of Patent: Jun. 19, 1990

[54] ORGANIC SECONDARY BATTERY

[75] Inventors: Toshiyuki Ohsawa, Tokyo; Tsutomu Matsuda, Shizuoka; Koji Uji-Ie, Tokyo; Hiroshi Nishihara, Tokyo, all of Japan

[73] Assignee: Ricoh Company, Ltd., Tokyo, Japan

[21] Appl. No.: 219,869

[22] Filed: Jul. 12, 1988

Related U.S. Application Data

[63] Continuation of Ser. No. 866,927, May 27, 1986, abandoned.

[30] Foreign Application Priority Data

| May 27, 1985 | [JP] | Japan | 60-113894 |
| Aug. 5, 1985 | [JP] | Japan | 60-172035 |
| Dec. 2, 1985 | [JP] | Japan | 60-271078 |
| Feb. 25, 1986 | [JP] | Japan | 61-38193 |

[51] Int. Cl.$^5$ .................................... H01M 4/60
[52] U.S. Cl. .......................... 429/213; 429/212
[58] Field of Search ........................ 429/212, 213

[56] References Cited

U.S. PATENT DOCUMENTS

| 4,442,187 | 4/1984 | MacDiarmip et al. | 429/213 |
| 4,517,116 | 5/1985 | Ivory et al. | 528/490 X |
| 4,520,086 | 5/1985 | Skotheim | 429/192 |
| 4,543,306 | 9/1985 | Dubois et al. | 429/213 X |
| 4,556,617 | 12/1985 | Kruger | 429/213 X |

Primary Examiner—Stephen J. Kalafut
Attorney, Agent, or Firm—Oblon, Spivak, McClelland, Maier & Neustadt

[57] ABSTRACT

An organic secondary battery comprising an anode including an anode-active material, a cathode including a cathode-active material and an electrolytic medium, in which at least the cathode-active material consists essentially of a benzene polymer, and a method of producing the benzene polymer by electrolytic polymerization with anodic oxidation of a benzene or benzene derivative monomer in an electrolytic solution.

22 Claims, 4 Drawing Sheets

ORGANIC SECONDARY BATTERY

This application is a continuation of application Ser. No. 06/866,927, filed on May 27, 1986, now abandoned.

BACKGROUND OF THE INVENTION

The present invention relates to an organic secondary battery and more particularly to a non-aqueous organic secondary battery.

Recently many different types of organic secondary batteries using as cathode-active and/or anode-active materials polymeric materials having conjugated double bonds.

For instance, in J. Chem. Soc., Chem. Commun., (1982) 361-362, an organic secondary battery using polyphenylene as its active materials is proposed. The polyphenylene reported in this reference was prepared by a chemical polymerization method and was in the form of powder. In order to use the powder-like polymer as active-material in a thin-type battery, it was necessary to work the powder-like polymer into a film. The thus prepared polyphenylene film, however, has the drawbacks that the self-discharge is great and the film working process is not easy.

In order to use polymeric materials having conjugated double bonds as cathode-active material, it is necessary that the polymeric materials have the property of allowing N-type doping. Polymeric materials capable of allowing such N-type doping, however, are limited to particular materials such as polyacetylene, poly para-phenylene and polythiophene. When these polymers are employed as cathode-active material, polyacetylene has the shortcoming that it is unstable when worked into a film, poly para-phenylene is in the form of powder and therefore it must be worked into a film, but the obtained film is poor in flexibility, and polythiophene has the shortcoming that the self-discharge is great. In short, these polymers are not suitable for use as cathode-active material of organic secondary batteries and thin-type batteries. Under such circumstances, an organic secondary battery of a light and thin type having high stableness and minimized self-discharge has not been available yet.

SUMMARY OF THE INVENTION

It is therefore an object of the present invention to provide an organic secondary battery of a light and thin type which is free from the above shortcomings of the conventional organic secondary batteries and pollution problems and has high energy density.

Another object of the present invention is to provide an organic secondary battery with at least its cathode-active material comprising a benzene polymer film having high stableness and minimized self-discharge, which is prepared by polymerizing a benzene or benzene derivative monomer by electrolytic polymerization.

Still another object of the present invention is to provide an organic secondary battery with its cathode-active material comprising the above-mentioned benzene polymer and its anode-active material comprising a polypyrrole film which is prepared by polymerizing pyrrole by electrolytic polymerization.

A further object of the present invention is to provide an organic secondary batttery of the above-mentioned type having a separator comprising a polyfuran complex between its cathode and anode.

A further object of the present invention is to provide a method of polymerizing a benzene or benzene derivative monomer to produce the above-mentioned benzene polymer by electrolytic polymerization.

The electrolytic polymerization can be carried out in an electrolytic polymerization system including an electrolytic solution of a benzene or benzene derivative monomer, an electrolyte dissolved in a solvent, with a cathode and an anode immersed in the solution. The electrolytic polymerization is performed with anodic oxidation by causing an electric current to flow through the above system. In this electrolytic polymerization, in addition to conventional electrolytes, catalysts for Friedel Crafts reaction and electrolytes capable of producing Lewis acids in the presence of a transition metal complex can be employed.

DETAILED DESCRIPTION OF THE PREFERRED EMBODIMENTS

An organic secondary battery according to the present invention comprises an anode, a cathode and an electrolytic medium. When necessary, the anode and cathode each can include a current collector. A separator can also be interposed between the cathode and the anode. As the electrolytic medium an electrolytic solution comprising a solvent and an electrolyte can be employed. Instead of the electrolytic solution, a solid electrolyte can also be employed.

The cathode comprises a cathode-active material, and the anode comprises an anode-active material. The cathode-active material and the anode-active material are respectively doped with a cation and an anion for storing electric energy therein and the stored energy is discharged through the external circuit which connects the cathode and the anode.

As the electrolytes of the electrolytic solution, for example, salts comprising the following anion dopants and cation dopants can be employed:

(1) Anion dopants: halogenated anions of Va-group elements, such as $PF_6^-$, $SbF_6^-$, $AsF_6^-$ and $SbC_6^-$; halogenated anions of IIIa-group elements, such as $BF_4^-$; and perchlorate anions such as $ClO_4^-$.

(2) Cation dopants: alkali metal ions such as $Li^+$ and $K^+$; and tetraamonium ions such as $R_4N^+$ (where R represents a hydrocarbon group having 1 to 20 carbon atoms)

The above anion dopants provide an N-type electroconductive conjugated polymer, while the cation dopants provide a P-type polymer in the battery.

Specific examples of the above electrolytes capable of providing the above dopants are as follows: $LiPF_6$, $LiSbF_6$, $LiAsF_6$, $LiClO_4$, $NaClO_4$, $KI$, $KPF_6$, $KSbF_6$, $KAsF_6$, $KClO_4$, $[(n-Bu)_4N]^+ \cdot (AsF_6)^-$, $[(n-Bu)_4N]^+ \cdot ClO_4^-$, $LiAlCl_4$, $LiBF_4$, where Bu represents a butyl group.

As the solvents for the electroylytic solution, polar non-protonic solvents having high specific dielectric constant, for example, ketones, nitriles, esters, carbonates, nitro compounds, sulfolane-type componds and lactone-type compounds, can be employed. Of these compounds, nitriles, carbonates, sulfolane-type compounds and lactone-type compounds are preferable for use. Specific examples of these compounds are acetonitrile, propionitrile, butyronitrile, valeronitrile, benzonitrile, ethylene carbonate, propylene carbonate, γ-butyrolactone, sulfolane and 3-methylsulfolane.

In the present invention, at least as the cathode-active material, a benzene polymer is employed. In the present invention, the term "benzene polymer" means not only linear polymers such as polyphenylene, but also planar polymers such as polyacene and polyacenone.

The benzene polymer for use in the present invention is prepared by polymerization of a benzene or benzene derivative monomer. The benzene monomer is benzene, and a benzene derivative monomer is, for example, diphenyl, halogenated benzene and halogenated diphenyl.

It is preferable that a benzene polymer film be prepared by an electrochemical method. A general electrochemical method is described, for instance, in J. Electrochem. Soc., Vol. 130, No. 7 1506~1509 (1983), Electrochimica Acta, Vol. 27, No. 1. 61~65 (1982) and J. Chem. Soc., Chem. Commun, 1199 (1984).

In the present invention, the above polymerization is performed by placing an electrolytic solution of the above-mentioned benzene or benzene derivative monomer, an electrolyte and a solvent in an electrolytic chamber, immersing a cathode and an anode in the solution, followed by electrolytic polymerization with anodic oxidation by causing an electric current to flow through the electrolytic solution.

As such electrolytes, (i) conventional electrolytes such as $LiPF_6$, $LiSbF_6$, $LiAsF_6$, $LiClO_4$, $NaClO_4$, KI, $KPF_6$, $KSbF_6$, $KAsF_6$, $KClO_4$, $AgBF_4$, $NaBF_4$, $NaAsF_6$, $NaPF_6$, $[(n-Bu)N]^+\cdot(AsF_6)^-$, $[(n-Bu)_4N]^+\cdot ClO_4^-$, (ii) catalysts for Friedel Crafts reaction, such as $FeCl_3$, $AlCl_3$, $ZnCl_2$ and $AlBr_3$, and (iii) electrolytes containing an anion capable of producing a Lewis acid in the presence of a transition metal complex. When the Friedel Crafts catalysts are employed, it is considered that the complex or reaction product of the employed solvent and the catalyst works as electrolyte.

When benzene is employed as the monomer, the above Friedel Crafts catalysts and mixtures of the catalysts and other electrolytes are effective for the polymerization reaction.

As the solvent, for example, acetonitrile, benzonitrile, propylene carbonate, γ-butyrolactone, dichloromethane, dioxane, dimethylformamide, and nitro compound solvents such as nitromethane, nitroethane, nitropropane and nitrobenzene (each having a doner number of less than about 10) can be employed.

When benzene is employed as the monomer, the above nitro compound solvents having such small doner numbers are preferable for use.

As the materials for constructing the electrodes for the electrolytic polymerization, metals such as Au, Pt and Ni and metal oxides such as $SnO_2$ and $In_2O_3$ can be employed. Further composite electrodes and coating electrodes comprising the above metal oxides can also be employed. It is preferable that the anode be made of the metal oxide for obtaining a benzene polymer film having high strength.

For electrolysis, constant-voltage electrolysis, constant-current electrolysis and constant-potential electrolysis can all be employed. Of these, constant-current electrolysis and constant-potential electrolysis are most suitable. In particular, constant-current electrolysis is suitable for mass production.

In the electrolysis, the adjustment of the current density is important since it has a significant effect on the morphology of the polymeric film to be made. Therefore it is necessary to make fine adjustment of the current density by appropriate combination of the electrolytes.

The thus produced benzene polymer is in the form of a film having a thickness of about 1000 μm or less and is electrochemically active. Therefore it is useful as cathode-active material. In particular, a benzene polymer having a structure grown in the form of a layer has a great specific area, allows N-type doping and is stable. Therefore it is preferable for use as cathode-active material. The benzene polymer can also be employed as anode-active material.

ACTIVE MATERIAL PREPARATION EXAMPLE 1

Figure 1:
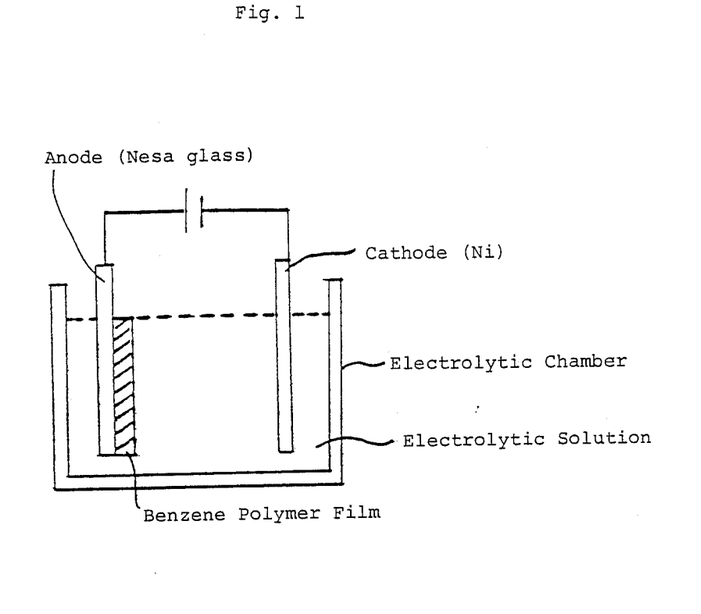
FIG. 1 is a schematic illustration of an electrolytic polyermization system for preparing a benzene polymer for use in an organic secondary battery according to the present invention.

In an electrolytic chamber provided with an anode of Ness glass (30 Ω/cm²) and a cathode of Ni as shown in FIG. 1, an electrolytic solution of benzene (0.1 M) and anhydrous aluminum chloride (0.2 M) dissolved in nitromethane was placed. Constant-current electrolysis with 25 mA/cm² was performed, so that a benzene polymer film No. 1 was prepared on the Nesa glass as shown in FIG. 1.

ACTIVE MATERIAL PREPARATION EXAMPLE 2

In the same electrolytic chamber provided with the anode of Nesa glass (30 Ω/cm²) and the cathode of employed in Active Material Preparation Example 1, an electrolytic solution of benzene (0.1 M) and anhydrous aluminum chloride (0.2 M) dissolved in nitrobenzene was placed. Constant-current electrolysis with 20 mA/cm² was performed, so that a benzene polymer film No. 2 was prepared.

ACTIVE MATERIAL PREPARATION EXAMPLE 3

In the same electrolytic chamber provided with the anode of Nesa glass (30 Ω/cm²) and the cathode of Ni as that employed in Active Material Preparation Example 1, an electrolytic solution of benzene (0.05 M) and anhydrous aluminum chloride (0.1 M) dissolved in nitromethane was placed. Constant-current electrolysis with 35 mA/cm² was performed, so that a benzene polymer film No. 3 was prepared.

ACTIVE MATERIAL PREPARATION EXAMPLE 4

In the same electrolytic chamber provided with the anode of Nesa glass (30 Ω/cm²) and the cathode of Ni as that employed in Active Material Preparation Example 1, an electrolytic solution of benzene (0.1 M) and iron chloride (0.1 M) dissolved in nitromethane was placed. Constant-current electrolysis with 20 mA/cm² was performed, so that a benzene polymer film No. 4 was prepared.

In addition to the polymerization method using the above Friedel Crafts catalysts, a polymerization method using a boron trifluoride complex as Lewis acid is capable of yielding a thick and uniform benzene polymer film for use in the present invention.

Specific examples of a boron trifluoride complex are $BF_3$ methanol complex, $BF_3$ ethanol complex, $BF_3$ propanol complex, $BF_3$ dimethyl ether complex, $BF_3$ diethyl ether complex, $BF_3$ phenol complex and $BF_3$ acetic acid complex.

As electrolytic solvents for this polymerization method, non-protonic solvents, such as acetonitrile, benzonitrile, propylene carbonate, γ-butyrolactone, dichloromethane, dichloroethane, dimethylformamide, nitromethane, nitroethane and nitrobenzene, can be employed.

The most appropriate polymerization system for this method is a system of $BF_3$ ether complex as Lewis acid and a solvent having a small doner number (about 10 or less) (for example, nitromethane, nitroethane, nitrobenzene, dichloroethane and dichloromethane). By this system, a high quality benzene polymer film with can be obtained.

As the monomer for the benzene polymer, for example, benzene, diphenyl, and halogenated benzene and diphenyl are preferable for use.

The above polymerization is performed by placing a solution comprising one of the above-mentioned monomers, the Lewis acid, and the solvent in an electrolytic chamber, immersing a cathode and an anode in the solution, followed by electrolytic polymerization with anodic oxidation by causing an electric current to flow therethrough.

When necessary, electrolytes and other catalysts can be added to the polymerization system.

As such electrolytes, $LiPF_6$, $LiSbF_6$, $LiAsF_6$, $LiCl_4$, $NaClO_4$, KI, $KPF_6$, $KSbF_6$, $KClO_4$, $AgBF_4$, $NaBF_4$, $NaAsF_6$, $NaPF_6$, $[(n-Bu)_4N^+]\cdot(BF_4)^-$, $[(n-Bu)_4N^+]\cdot(AsF_6)^-$ and $[(n-Bu)_4N]^+\cdot ClO_4^-$ are preferable in use.

Further, it is preferable that water and oxygen be eliminated as much as possible from the polymerization system for extending the pot life of the polymerization solution. The quality of the benzene polymer film is not significantly affected even if the polymerization is carried out in such a condition as to be exposed to the air.

As the materials for constructing the electrodes for the electrolytic polymerization, metals such as Au, Pt and Ni and metal oxides such as $SnO_2$ and $In_2O_3$ can be employed. Further composite electrodes and coating electrodes comprising the above metal oxides can also be employed. It is preferable that the anode be made of the metal oxide for obtaining a polymer film having high strength.

For electrolysis, constant-voltage elecrtrolysis, constant-current electrolysis and constant-potential electrolysis can all be employed. Of these, constant-current electrolysis and constant-potential electrolysis are most suitable. In particular, constant-current electrolysis is suitable for mass production.

In the electrolysis, the adjustment of the current density is important since the current density has a significant effect on the morphology of the obtained film. Therefore it is necessary to make fine adjustment of the current density by appropriate combination of the electrolytes.

This polymerization method is completely safe since no poisonous gases such as boron trifluoride and fluorine are generated in the course of polymerization. Further this method is capable of yielding a benzene polymer in a stable manner.

Immediately after the polymerization, the obtained benzene polymer film contains gaseous dopants such as $BF_3$. Such dopants, however, can be easily removed by cleaning the film. Such an undoped film can be doped with other different dopants.

Such doping can be carried out, for instance, by (i) a doping method using Lewis acids such as $I_2$, $Br_2$, $Cl_2$, $AsF_5$ and $SbF_5$, (ii) a doping method using Brϕnstead acids such as $FSO_3H$, $HNO_3$, $CF_3SO_3H$, $H_2SO_4$ and $S_3$ and (iii) an electrochemical doping method in which the doping is performed in an electrolytic solution of a salt comprising in combination a cation such as $Li^+$, $Na^+$, $Ag^+$, $EtN^+$, $Bu_4N^+$ and an anion such as $ClO_4^-$, $BF_4^-$, $PF_6^-$ and $AsF_6^-$.

The benzene polymer film obtained by the above method is uniform and stable in quality. The electroconductivity of the film can be increased by doping. Therefore it can find many different applications, for instance, for use as material for electrodes, semi-conductor, electrochromic material, electromagnetic shielding material and non-linear optical material.

ACTIVE MATERIAL PREPARATION EXAMPLE 5

In an electrolytic chamber provided with an anode of Nesa glass (30 $\Omega/cm^2$) and a cathode of Ni as shown in FIG. 1, an electrolytic solution of benzene (0.1 M) and a boron trifluoride diethyl ether complex (0.2 M) dissolved in nitrobenzene was placed. Constant-current electrolysis with 5 ma/$cm^2$ was performed, so that a benzene polymer film No. 5 was prepared.

The thickness of the benzene polymer film No. 5 was 55 μm and the electroconductivity σ was $1.2 \times 10^{-2}$ S/cm (immediately after growth).

Figure 2:
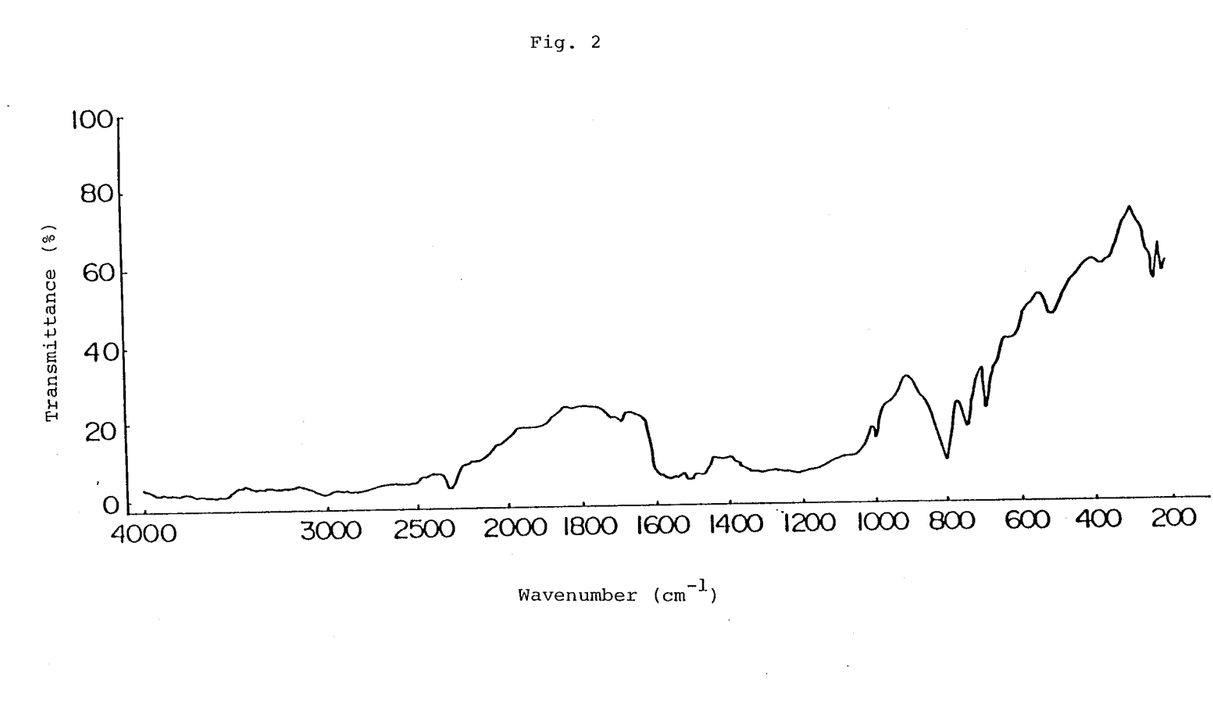
FIG. 2 is an IR spectrum of a benzene polymer film No. 5.

FIG. 2 shows an IR spectrum of the benzene polymer film No. 5. The IR spectrum of the benzene polymer film No. 5 indicates absorbance peaks at 701.97 $cm^{-1}$, 754.04 $cm^{-1}$, 806.11 $cm^{-1}$, 1002.81 $cm^{-1}$, 1481.08 $cm^{-1}$, 1598.72 $cm^{-1}$, 1710.57 $cm^{-1}$ and 3027.73 $cm^{-1}$ which are characteristic of polyphenylene.

Figure 3:
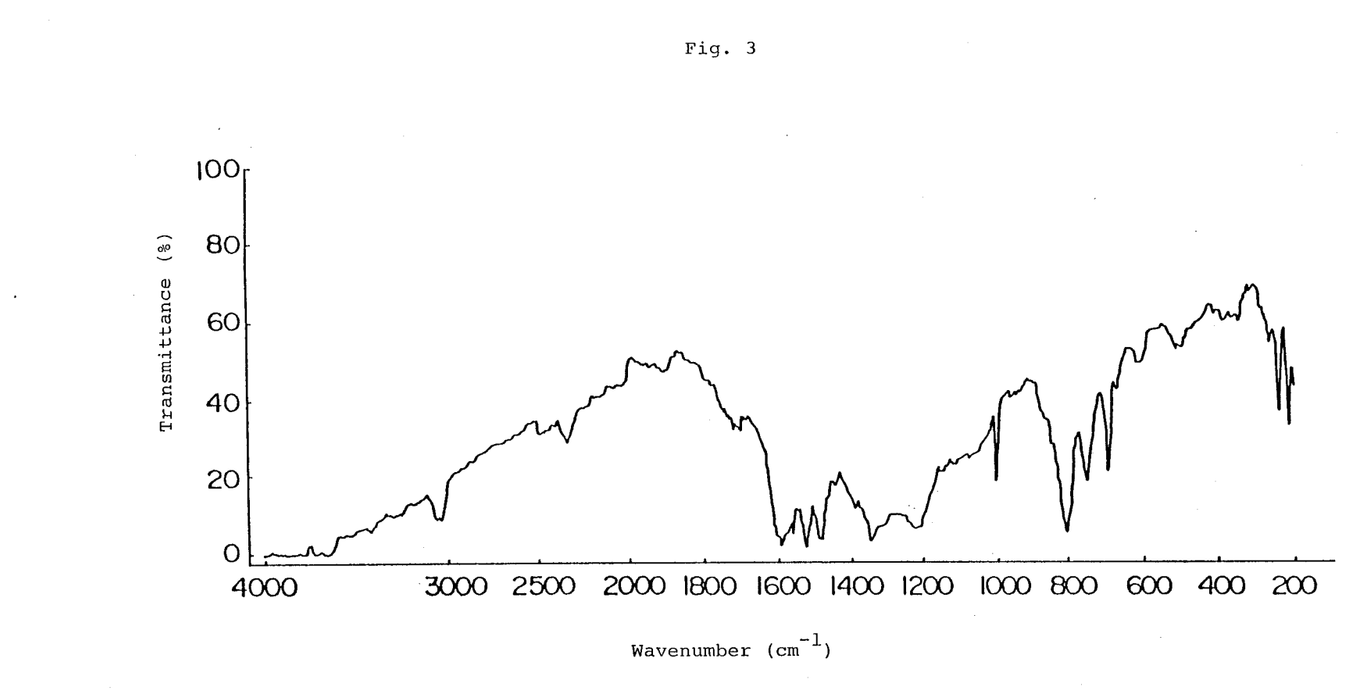
FIG. 3 is an IR spectrum of an undoped benzene polymer film No. 5.

The benzene polymer film No. 5 was washed with water for undoping. FIG. 3 shows the IR spectrum of the undoped benzene polymer film No. 5.

ACTIVE MATERIAL PREPARATION EXAMPLE 6

In the same electrolytic chamber provided with the anode of Nesa glass (30 $\Omega/cm^2$) and the cathode of Ni as that employed in Active Material Preparation Example 1, an electrolytic solution of benzene (0.1 M) and a boron trifluoride diethyl ether complex (0.2 M) dissolved in nitrobenzene was placed. Constant-current electrolysis with 1 mA/$cm^2$ was performed in an atmosphere of Ar gas ($O_2$: 1 ppm or less; the dew point: $-81°$ C.), so that a benzene polymer film No. 6 was prepared. In the above preparation, the employed benzene and nitrobenzene were dehydrated by a molecular sieve and were then distilled under vacuum before use. The thickness of the benzene polymer film No. 6 was 42 μm and the electroconductivity σ was $0.72 \times 10^{-2}$ S/cm (immediately after growth).

ACTIVE MATERIAL PREPARATION EXAMPLE 7

In the same electrolytic chamber provided with the anode of Nesa glass (30 $\Omega/cm^2$) and the cathode of Ni as that employed in Active Material Preparation Example 1, an electrolytic solution of diphenyl (0.1 M), a boron trifluoride diethyl ether complex (0.2 M) and [(n—Bu$_4$N)]$^+$·(BF$_4$)$^-$ (0.1 M) dissolved in nitrobenzene was placed. Constant-voltage electrolysis with 10 V was performed, so that a benzene polymer film No. 7 was prepared.

The thickness of the benzene polymer film No. 7 was 12 μm and the electroconductivity σ was $1.6 \times 10^{-3}$ S/cm (immediately after growth).

ACTIVE MATERIAL PREPARATION EXAMPLE 8

In the same electrolytic chamber provided with the anode of Nesa glass (30 Ω/cm$^2$) and the cathode of Ni as that employed in Active Material Preparation Example 1, an electrolytic solution of benzene (0.1 M) and a boron trifluoride diethyl ether complex (0.1 M) dissolved in dichloromethane was placed. Constant-current electrolysis with 7 mA/cm$^2$ was performed in such a condition as to exposed to the air, so that a benzene polymer film No. 8 was prepared.

The thickness of the benzene polymer film No. 8 was 38 μm and the electroconductivity σ was $2.6 \times 10^{-2}$ S/cm (immediately after growth).

Further, a polymerization method of using a transition metal complex, instead of the above-mentioned borontrifluoride complex, and an electrolyte containing an anion capable of producing a Lewis acid in the presence of the transition metal complex is also capable of yielding a benzene polymer for use in the present invention.

Examples of the transition metal complex are complexes containing a transition metal (such as Ni, Co, Cu, Cr, Mn, Fe and Zn) and coordination compounds containing a transition metal. Specific examples of coordination compounds containing a transition metal are NiCl$_2$(PPh$_3$)$_2$, NiCl$_2$(PPh$_2$(allyl))$_2$, NiCl$_2$(PPh(allyl))$_2$, CoCl$_2$(PPh$_3$)$_2$, CoCl$_2$(PPh$_2$(allyl))$_2$, CoCl$_2$(PPh(allyl))$_2$, Co(NH$_3$)$_3$)$_2$(NO$_2$)$_3$, Mn(NH$_3$)$_6$(NO$_3$)$_2$, Cr(NH$_3$)$_6$(NO$_3$)$_2$ and Sn(NH$_3$)$_6$(NO$_3$)$_2$.

It is preferable that the content of such a complex in the electrolytic solution be in the range of 0.01 to 1.0 M.

It is preferable to use a monomer for this polymerization method benzene, diphenyl, naphthalene and anthracene which may have a halogen substituent (F, Cl, Br or I). Of these monomers, benzene and diphenyl are most preferable for use.

It is preferable that the content of such monomer in the electrolytic solution be in the range of 0.05 to 1.0 M.

The electrolytes that can be employed in this method are limited to particular electrolytic salts due to the use of the above-mentioned transition metal complexes. Specifically, the cations of the electrolytic salts are metal cations such as Na$^+$, K$^+$, Li$^+$ and Ag$^+$, organic cations such as (BU)$_4$N$^+$ (tetrabutylammonium) and (Et)$_4$N$^+$ (tetraethylammonium), and the counterpart anions are such anions that are capable of producing Lewis acids, such as AsF$_6^-$, PF$_6^-$, BF$_6^-$ and SbF$_6^-$ in the presence of the transition metal complex.

Specific examples of such electrolytes are LiPF$_6$, LiSbF$_6$, LiAsF$_6$, KPF$_6$, KsbF$_6$, AgBF$_4$, NaBF$_4$, NaAsF$_6$, NaPF$_6$, [(n—Bu)$_4$N]·(AsF$_6$), [(n—Bu)$_4$N]·BF$_4$, [(n—Bu)$_4$N]·PF$_6$, [(n—Bu)$_4$N]·SbF$_6$, [(n—Et)$_4$N]·BF$_4$.

It is preferable that the content of such an electrolyte in the electrolytic solution be in the range of 0.05 to 1.0 M.

As electrolytic solvents for this polymerization method, non-protonic solvents, such as acetonitrile, benzonitrile, propylene carbonate, γ-butyrolactone, dichloromethane, dichloroethane, dimethylformamide, nitromethane, nitroethane, and nitrobenzene, can be employed. Of these solvents, the most preferable solvents are solvents having small doner numbers of about 10 or less, for example, nitromethane, nitroethane, nitrobenzene, dichloroethane and dichloromethane.

As the materials for constructing the electrodes for the electrolytic polymerization, metals such as Au, Pt and Ni and metal oxides such as SnO$_2$ and In$_2$O$_3$ can be employed. Further composite electrodes and coating electrodes comprising the above metal oxides can also be employed. It is preferable that the anode be made of the metal oxide for obtaining a polymer film having high strength.

As the electrolytic chamber, a single electrolytic chamber provided with both cathode and anode in the chamber and a chamber with a cathode and an anode separately provided by a separator, can be employed. The above method can be carried out without difficulty in the single electrolytic chamber.

For electrolysis, constant-voltage elecrtrolysis, constant-current electrolysis and constant-potential electrolysis can all be employed. Of these, constant-current electrolysis and constant-potential electrolysis are most suitable. In particular, constant-current electrolysis is suitable for mass production.

In the electrolysis, the adjustment of the current density is important since the current density has a significant effect on the morphology of the polymeric film to be made. Therefore it is necessary to make fine adjustment of the current density by appropriate combination of the electrolytes. It is preferable that the current density be in the range of 0.1 to 30 mA/cm$^2$.

The benzene polymer film obtained by the above method can be undoped chemically or electrochemically. The undoped benzene polymer film can be doped with many different kinds of dopants.

Such doping can be carried out, for instance, by (i) a doping method using Lewis acids such as I$_2$, Br$_2$, Cl$_2$, AsF$_5$ and SbF$_5$, (ii) a doping method using Brφnstead acids such as FSO$_3$H, HNO$_3$, CF$_3$SO$_3$H, H and S$_3$ and (iii) an electrochemical doping method in which the doping is performed in an electrolytic solution of a salt comprising in combination a cation such as Li$^+$, Na$^+$, Ag$^+$, EtN$^+$, Bu$_4$N$^+$ and an anion such as ClO$_4^-$, BF$_4^-$, PF$_6^-$ and AsF$_6^-$.

ACTIVE MATERIAL PREPARATION EXAMPLE 9

In the same electrolytic chamber provided with the anode of Nesa glass (30 Ω/cm$^2$) and the cathode of Ni as that employed in Active Material Preparation Example 1, an electrolytic solution of benzene (0.1 M), NiCl$_2$(PPh(allyl))$_2$ (0.01 M) and [Bu$_4$N]·BF$_4$ (0.1 M) dissolved in nitrobenezene was placed. Constant-current electrolysis with 15 mA/cm$^2$ was performed for 0.5 hours, so that a benzene polymer film No. 9 was obtained at the surface of the Nesa glass. The obtained benzene polymer film was glossy, brown and uniform in quality.

The thickness of the benzene polymer film No. 9 was 43 μm and the electroconductivity σ was $2.5 \times 10^{-4}$ S/cm (immediately after growth).

An IR spectrum of this benzene polymer film indicated absorbance peaks at 690, 760, 800 and 1000 cm$^{-1}$ characteristic of polyphenylene.

ACTIVE MATERIAL PREPARATION EXAMPLE 10

In the same electrolytic chamber provided with the anode of Nesa glass (30 $\Omega/cm^2$) and the cathode of Ni as that employed in Active Material Preparation Example 1, an electrolytic solution of benzene (0.1 M), $NiCl_2(PPh_3)_2$ (0.1 M) and $[Bu_4N]\cdot PF_6$ (0.1 M) dissolved in nitrobenzene was placed. Constant-current electrolysis with 1 $mA/cm^2$ was performed in an atmosphere of Ar gas ($O_2$: 1 ppm or less; the dew point: $-81°$ C.) for 8 hours, so that a benzene polymer film No. 10 was prepared. In the above preparation, the employed benzene and nitrobenzene were dehydrated by a molecular sieve and were then distilled under vacuum before use.

The thickness of the benzene polymer film No. 10 was 42 $\mu m$ and the electroconductivity $\Omega$ was $1.6 \times 10$ S/cm (immediately after growth).

ACTIVE MATERIAL PREPARATION EXAMPLE 11

In the same electrolytic chamber provided with the anode of Nesa glass (30 $\Omega/cm^2$) and the cathode of Ni as that employed in Active Material Preparation Example 1, an electrolytic solution of benzene (0.1 M), $CoCl_2(PPh_3)2$ (0.2 M) and $[Bu_4N]\cdot BF_4$ (0.1 M) dissolved in nitrobenezene was placed. Constant-voltage electrolysis with 20 V was performed for 0.5 hours, so that a benzene polymer film No. 11 was obtained.

The thickness of the benzene polymer film No. 11 was 29 $\mu m$ and the electroconductivity $\Omega$ was $5.3 \times 10^{-3}$ S/cm (immediately after growth).

ACTIVE MATERIAL PREPARATION EXAMPLE 12

In the same electrolytic chamber provided with the anode of Nesa glass (30 $\Omega/cm^2$) and the cathode of Ni as that employed in Active Material Preparation Example 1, an electrolytic solution of benzene (0.1 M), $Co(NH_3)_3(NO_2)_3$ (0.02 M) and $[Bu_4N]\cdot AsF_6$ (0.1 M) dissolved in nitrobenezene was placed. Constant-current electrolysis with 15 $mA/cm^2$ was performed for 0.5 hours with exposure to the air, so that a benzene polymer film No. 12 was obtained.

The thickness of the benzene polymer film No. 12 was 41 $\mu m$ and the electroconductivity $\Omega$ was $2.0 \times 10^{-3}$ S/cm (immediately after growth).

ACTIVE MATERIAL PREPARATION EXAMPLE 13

In the same electrolytic chamber provided with the anode of Nesa glass (30 $\Omega/cm^2$) and the cathode of Ni as that employed in Active Material Preparation Example 1, an electrolytic solution of benzene (0.1 M), $NiCl_2(PPh_3)_2$ (0.1 M) and $[Bu_4N]BF_4$ (0 1 M) dissolved in nitrobenezene was placed. Constant-current electrolysis with 1 $mA/cm^2$ was performed for 8 hours, so that a benzene polymer film No. 13 was obtained.

The thickness of the benzene polymer film No. 13 was 35 $\mu m$ and the electroconductivity $\Omega$ was 4.5 S/cm (immediately after growth).

ACTIVE MATERIAL PREPARATION EXAMPLE 14

In the same electrolytic chamber provided with the anode of Nesa glass (30 $\Omega/cm^2$) and the cathode of Ni as that employed in Active Material Preparation Example 1, an electrolytic solution of benzene (0.1 M), $NiCl_2(PPh_3)_2$ (0.1 M) and $NaAsF_6$ (0.1 M) dissolved in dichloromethane was placed. Constant-current electrolysis with 10 $mA/cm^2$ was performed for 0.5 hours, so that a benzene polymer film No. 14 was obtained.

The thickness of the benzene polymer film No. 14 was 23 $\mu m$ and the electroconductivity $\Omega$ was $3.2 \times 10^{-3}$ S/cm (immediately after growth).

ACTIVE MATERIAL PREPARATION EXAMPLE 15

In the same electrolytic chamber provided with the anode of Nesa glass (30 $\Omega/cm^2$) and the cathode of Ni as that employed in Active Material Preparation Example 1, an electrolytic solution of diphenyl (0.1 M), $NiCl_2(PPh_3)_2$ (0.1 M) and $[Bu_4N]\cdot AsF_6$ (0.1 M) dissolved in nitrobenzene was placed. Constant-current electrolysis with 15 $mA/cm^2$ was performed for 0.5 hours, so that a benzene polymer film No. 15 was obtained.

The thickness of the benzene polymer film No. 15 was 35 $\mu m$ and the electroconductivity $\Omega$ was $2.2 \times 10^{-2}$ S/cm (immediately after growth).

In the organic secondary battery according to the present invention, as anode-active materials, for example, (i) polymers including conjugated double bonds of acetylene, pyrrole, thiophene, aniline, benzene, azulene and derivatives thereof, and (ii) polymer complexes of the above polymers and electrolytic anions which will be specifically mentioned later, can be employed. As mentioned previously, the benzene polymer employed as cathode-active material in the present invention can also be employed as anode-active material.

For fabrication of a thin type battery, it is preferable that the above polymers and polymer complexes be prepared by electrolytic polymerization.

When a polypyrrole complex is employed as anode-active material, it is preferable to use as its monomer pyrrole, 3,4-alkylpyrrole, 3,4-arylpyrrole, 3-alkyl-4-arylpyrrole and 4-alkyl-3-arylpyrrole. In such monomers, it is preferable that the alkyl be an alkyl group having 1 to 4 carbon atoms, and the aryl group be a phenyl group, a tolyl group and a xylyl group. Further such monomers are not limited to monomers, but dimers and trimers can also be employed. Hereinafter these starting materials are collectively referred to as the pyrrole-type monomers.

In preparation of the polypyrrole complexes, as electrolytic solvents, water, methanol, acetonitrile, benzonitrile, propylene carbonate, $\gamma$-butyrolactone, nitrobenzene, dioxane, dimethylformamide and acetone can be employed. In view of the reactivity and the strength of the polypyrrole complex film, acetonitrile, benzonitrile and propylene carbonate are most preferable for use.

As electrolytic anions for this polymerization method, inorganic anions such as $ClO_4^-$, $PF_6^-$, $AsF_6^-$, $CF_3^-$, $SO_3^-$ and $BF_4^-$, and unsubstituted and substituted aromatic anions such as aromatic sulfonic acids and aromatic carboxylic acids, which may have one or more identical or different substituents such as an alkyl group having 1 to 3 carbon atoms, a nitro group and a cyano group (for example, p-toluene sulfonic acid and nitrobenzene sulfonic acid) are preferable for use.

As counterpart cations, alkali metal cations such as $N^+$, $K^+$ and $Li^+$, ammonium cations such as $(C_2H_5)_4N^+$, $(C_4H_9)_4N^+$, $(C_6H_{13})_4N^+$, and $H^+$ are preferable for use.

The polypyrrole complex film is prepared by subjecting the above-mentioned pyrrole-type mononer to electrolytic polymerization in the presence of an electrolyte comprising the above-mentioned anion and cation. Upon causing an electric current to flow through a solution of the pyrrole-type monomer and the electrolyte dissolved in one of the above-mentioned solvents, the polyryrrole complex film is readily formed. It is preferable that the current density in the above electrolytic polymerization be in the range of about 0.1 to 1.5 mA/cm$^2$ and the content of the pyrrole-type monomenr in the electrolytic solution be in the range of 0.02 to 1.00 M, more preferably in the range of 0.10 to 0.30 for obtaining an uniform film with high yield.

In the above electrolytic polymerization, it is preferable that the polymerization be performed in the presence of both the aromatic anion and the inorganic anion. This is because when both aromatic anion and inorganic anion are present, the obtained polypyrrole complex film can be doped and undoped with its film strength maintained high, so that when it is employed as anode-active material in an organic secondary battery, high recharging and discharging performance can be attained.

In this method, it is preferable that the current density be in the range of about 1.0 to 1.5 mA/cm$^2$ in view of the reactivity in the polymerization, the uniformity, strength and thickness of the obtained film.

It is preferable that the content of the aromatic anion be in the range of 0.01 to 0.2 M in view of the polymerization efficiency and the mechanical strength of the obtained film.

Further it is preferable that the molar content ratio of the aromatic anion to the inorganic anion in the electrolytic solution be (1): (about 0.2 to 2) for obtaining appropriate current density and a film having high mechanical strength. In other words, it is preferable that the ratio be 1 M of the aromatic anion to about 0.2 to 2 M of the inorganic anion.

The above polymerization is performed by placing a solution comprising the pyrrole-type monomer, an aromatic anion salt, an inorganic anion salt and a solvent in an electrolytic chamber, immersing a cathode and an anode in the solution, and then performing an electrolytic polymerization with anodic oxidation by causing an electric current to flow therethrough.

As the materials for constructing the electrodes for the electrolytic polymerization, metals such as Au, Pt and Ni and metal oxides such as $SnO_2$ and $In_2O_3$ can be employed. Further composite electrodes and coating electrodes comprising the above metals and/or metal oxides can also be employed. It is preferable that the anode be made of the metal oxide for obtaining a polypyrrole complex film having high strength.

ACTIVE MATERIAL PREPARATION EXAMPLE 15

In the same electrolytic chamber provided with the anode of Nesa glass (30 $\Omega$/cm$^2$) and the cathode of Ni as that employed in Active Material Preparation Example 1, an electrolytic solution of pyrrole (0.1 M), sodium nitrobenzene sulfonate (0.03 M) and tetrabutylammonium tetrafluoroborate (0.03 M) dissolved in acetonitrile was placed. Constant-voltage electrolysis with 4.0 V (current density 2.5 mA/cm ) was performed, so that a polypyrrole film No. 1 was obtained.

ACTIVE MATERIAL PREPARATION EXAMPLE 16

In the same electrolytic chamber provided with the anode of Nesa glass (30 $\Omega$/cm$^2$) and the cathode of Ni as that employed in Active Material Preparation Example 1, an electrolytic solution of pyrrole (0.1 M), sodium p-toluene sulfonate (0.05 M) and tetrabutylammonium tetrafluoroborate (0.03 M) dissolved in acetonitrile was placed. Constant-voltage electrolysis with 4.0 V (current density 2.5 mA/cm$^2$) was performed, so that a polypyrrole film No. 2 was obtained.

ACTIVE MATERIAL PREPARATION EXAMPLE 17

In the same electrolytic chamber provided with the anode of Nesa glass (30 $\Omega$/cm$^2$) and the cathode of Ni as that employed in Active Material Preparation Example 1, an electrolytic solution of pyrrole (0.1 M) and $NaAsF_6$ (0.2 M) dissolved in acetonitrile was placed. Constant-current electrolysis with 2 mA/cm$^2$ was performed, so that a polypyrrole film No. 3 was prepared.

ACTIVE MATERIAL PREPARATION EXAMPLE 18

In the same electrolytic chamber provided with the anode of Nesa glass (30 $\Omega$/cm$^2$) and the cathode of Ni as that employed in Active Material Preparation Example 1, an electrolytic solution of azulene (0.005 M) and $AgClO_4$ (0.1 M) dissolved in acetonitrile was placed. Constant-current electrolysis with 15 mA/cm$^2$ was performed, so that a polyazulene film No. 1 was prepared.

ACTIVE MATERIAL PREPARATION EXAMPLE 19

In the same electrolytic chamber provided with the anode of Nesa glass (30 $\Omega$/cm$^2$) and the cathode of Ni as that employed in Active Material Preparation Example 1, an electrolytic solution of thiophene (0.1 M) and $LiClO_4$ (0.2 M) dissolved in acetonitrile was placed. Constant-current electrolysis with 5 mA/cm$^2$ was performed, so that a polythiophene film No. 1 was prepared.

ACTIVE MATERIAL PREPARATION EXAMPLE 20

An acetylene gas was blown against the surface of a Ziegler-Natta catalyst ($Ti(OC_4H_9)_4$–$Al(C_2H_5)_3$) liquid in an atmosphere of argon in accordance with the conventionally known method called "Shirakawa Method" (for example, described in Polymer Journal No. 2,231 (1971)), whereby a polyacetylene film No. 1 with a thickness of about 200 $\mu$m was obtained.

To the electrodes of the organic secondary battery according to the present invention, a current collector made of a sheet of Al, Ni, Pt, Au or Ag can be applied to the respective active materials with pressure, adhesion, vacuum deposition or sputtering. The current collector can also be made of the above-mentioned polypyrrole film.

A separator disposed between the anode and the cathode of the organic secondary battery according to the present invention can be made of a glass fiber filter, a polymeric pore filter (made of polyester, teflon, polypropylene or polyfuran), or a non-woven fabric of a glass fiber and the polymer such as polyester, teflon, polypropylene or polyfuran.

A polyfuran complex, which is a complex comprising a furan monomer units and anions, can be used as the separator for the organic secondary battery according to the present invention.

As a furan monomer for use in the polyfuran complex, for example, the following can be employed:

wherein $R^1$ and $R^2$ each represent hydrogen, an alkyl group or alkoxy group having 1 to 2 carbon atoms, or a halogen, and n is an integer of 1 to 3.

The polyfuran complex can be prepared by an electrolytic polymerization by causing electric current to flow through an electrolytic solution of a furan-type monomer and an electrolyte dissolved in an organic solvent.

As the electrolytes for this polymerization, electrolytic salts comprising the following cations and anions can be employed:

Examples of the cations are alkali metal cations, for instance, $Li^+$, $Na^+$ and $K^+$; ammonium cations, and $H^+$. Examples of the anions are halogenated anions of Va-group elements, for instance, $PF_6^-$, $SbF_6^-$, $AsF_6^-$ and $SbCl_6^-$, halogenated anions of IIIa-group elements, such as $BF_4^-$, and perchlorate anions such as $ClO_4^-$.

Specific examples of such electrolyte salts are $LiPF_6$, $LiSbF_6$, $LiAsF_6$, $LiClO_4$, $LiAlCl_4$, $LiBF_4$, $NaClO_4$, $KI$, $KPF_6$, $KSbF_6$, $KAsF_6$, $KClO_4$, $NaBF_4$, $NaAsF_6$, $NaPF_6$, $AgBF_4$, $AgClO_4$, $[(n-Bu)_4N]^+ \cdot (AsF_6)^-$, $[(n-Et)_4N]^+ \cdot ClO_4^-$, $[(n-Bu)_4N]^+ \cdot ClO_4^-$.

Of these electrolyte salts, $LiClO_4$, $AgClO_4$ and $KClO_4$ are particularly preferable for the formation of an excellent polyfuran complex film.

It is preferable that the content of a furan-type monomer in the electrolytic solution be in the range of about 0.02 to 1.00 M, more preferably in the range of about 0.10 to 0.30 M.

Further, it is preferable that the content of the electrolytic salts in the electrolytic solution be about 1.0 M or less for obtaining a polyfuran film with high uniformity in quality.

As electrolytic solvents for this polymerization method, non-protonic solvents, such as acetonitrile, benzonitrile, propylene carbonate, $\gamma$-butyrolactone, dichloromethane, nitrobenzene, nitromethane, nitroethane, dichloromethane, dioxane, dimethylforamide, can be employed. Of these solvents, acetonitrile and propylene carbonate are preferable. Benzonitrile is particularly preferable. Further, it is preferable that no water and oxygen be contained in the solvents for obtaining an uniform polymer complex film.

The above polymerization is performed by placing a solution comprising the furan-type monomer and the electrolytic salt dissolved in the above-mentioned solvent in an electrolytic chamber, immersing a cathode and an anode in the solution, and performing an electrolytic polymerization with anodic oxidation by causing an electric current to flow therethrough.

As the materials for constructing the electrodes for the electrolytic polymerization, metals such as Au, Pt and Ni and metal oxides such as $SnO_2$ and $In_2O_3$ can be employed. Further composite electrodes and coating electrodes comprising the above metal oxides can also be employed. It is preferable that the anode be made of such a metal oxide for obtaining a polyfuran complex film having high strength.

A polyfuran complex film obtained in the above described method has an extremely small electron conductivity with an electroconductivity of $10^{-5}$ S/m in a dry state, but has high ion-conductivity.

It is preferable that the polyfuran complex film be about 10 to 250 $\mu$m thick.

BATTERY EXAMPLE 1

An anode was prepared by applying to a Ni foil with pressure a polypyrrole film (4 mg/cm$^2$) (serving as an anode-active material) prepared in Active Material Preparation Example 5.

A cathode was prepared by applying to a Ni foil with pressure a benzene polymer film (12 mg/cm$^2$) (serving as a cathode-active material) prepared in Active Material Preparation Example 1.

As an electrolytic solution, $LiClO_4$ (1 M)/propylene carbonate was employed.

A separator was made of a polypropylene non-woven fabric, an external film was made of a 120 $\mu$m thick biaxial drawing polyester film, and a sealing material was made of Chemistat R99 (made by Toray Industries, Inc.

The anode, the cathode, the electrolytic solution, the separator and the sealing material were assembled as shown in FIG. 2, so that an organic secondary battery No 1 of a thin sheet-type was fabricated. External electrodes (not shown) were constructed by spot-welding Ni-lead wires to Ni foil current collectors (not shown).

The organic secondary battery No. 1 was evaluated with respect to the following points:

(1) Open-circuit Voltage (V):

The voltage across the two electrode was measured (i) immediately after recharging and (ii) one week after recharging.

(2) Energy Density (Wh/kg):

This was measured by recharging and discharging with a constant current (0.5 mA).

(3) Short-circuit Current (mA/cm$^2$):

This was measured one week after recharging.

The results of the evaluation of the battery No. 1 were as follows:

| Battery No. 1 | |
|---|---|
| Battery Elements | |
| Anode-active Material | Polypyrrole Film (Active Material Preparation Example 5) |
| Cathode-active Material | Benzene Polymer No. 1 (Active Material Preparation Example 1) |
| Electrolytic Solution | LiClO$_4$ (1 M)/Propylene carbonate |
| Results of Evaluation | |
| Open-circuit Voltage Immediately after recharging | 2.9 V |
| One week after recharging | 2.7 V |
| Short-circuit Current | 2.2 mA/cm$^2$ |
| Energy Density | 188 Wh/kg |

BATTERY EXAMPLE 2

An organic secondary battery No. 2 was fabricated in the same manner as in Battery Example 1 except that the battery elements were changed as shown in the following table and the fabricated battery No. 2 was evaluated in the same manner as in Battery Example 1. The results are also shown in the following table:

| Battery No. 2 | |
|---|---|
| Battery Elements | |
| Anode-active Material | Polypyrrole Film (Active Material Preparation Example 5) |
| Cathode-active Material | Benzene Polymer No. 2 (Active Material Preparation Example 2) |
| Electrolytic Solution | $LiBF_4$ (1 M)/Propylene carbonate |
| Results of Evaluation | |
| Open-circuit Voltage Immediately after recharging | 2.8 V |
| One week after recharging | 2.8 V |
| Short-circuit Current | 2.0 mA/cm$^2$ |
| Energy Density | 163 Wh/kg |

BATTERY EXAMPLE 3

An organic secondary battery No. 3 was fabricated in the same manner as in Battery Example 1 except the battery elements were changed as shown in the following table and the fabricated battery No. 3 was evaluated in the same manner as in Battery Example 1. The results are also shown in the following table:

| Battery No. 3 | |
|---|---|
| Battery Elements | |
| Anode-active Material | Benzene Polymer No. 3 (Active Material Preparation Example 3) |
| Cathode-active Material | Benzene Polymer No. 3 (Active Material Preparation Example 3) |
| Electrolytic Solution | $LiClO_4$ (1 M)/Propylene carbonate |
| Results of Evaluation | |
| Open-circuit Voltage Immediately after recharging | 3.3 V |
| One week after recharging | 2.9 V |
| Short-circuit Current | 2.5 mA/cm$^2$ |
| Energy Density | 146 Wh/kg |

BATTERY EXAMPLE 4

An organic secondary battery No. 4 was fabricated in the same manner as in Battery Example 1 except the battery elements were changed as shown in the following table and the fabricated battery No. 4 was evaluated in the same manner as in Battery Example 1. The results are also shown in the following table:

| Battery No. 4 | |
|---|---|
| Battery Elements | |
| Anode-active Material | Polyazulene Film (Active Material Preparation Example 18) |
| Cathode-active Material | Benzene Polymer No. 1 (Active Material Preparation Example 1) |
| Electrolytic Solution | $LiClO_4$ (1 M)/Propylene carbonate |
| Results of Evaluation | |
| Open-circuit Voltage Immediately after recharging | 2.8 V |
| One week after recharging | 2.6 V |
| Short-circuit Current | 2.4 mA/cm$^2$ |
| Energy Density | 144 Wh/kg |

COMPARATIVE BATTERY EXAMPLE 1

A comparative organic secondary battery No. 1 was fabricated in the same manner as in Battery Example 1 except the battery elements were changed as shown in the following table and the comparative battery No. 1 was evaluated in the same manner as in Battery Example 1. The results are also shown in the following table:

| Comparative Battery No. 1 | |
|---|---|
| Battery Elements | |
| Anode-active Material | Polypyrrole Film (Active Material Preparation Example 17) |
| Cathode-active Material | Polythiophene Film (Active Material Preparation Example 19) |
| Electrolytic Solution | $LiClO_4$ (1 M)/Propylene carbonate |
| Results of Evaluation | |
| Open-circuit Voltage Immediately after recharging | 2.3 V |
| One week after recharging | 1.6 V |
| Short-circuit Current | 2.0 mA/cm$^2$ |
| Energy Density | 65 Wh/kg |

COMPARATIVE BATTERY EXAMPLE 2

A comparative organic secondary battery No. 2 was fabricated in the same manner as in Battery Example 1 except the battery elements were changed as shown in the following table and the comparative battery No. 2 was evaluated in the same manner as in Battery Example 1. The results are also shown in the following table:

| Comparative Battery No. 2 | |
|---|---|
| Battery Elements | |
| Anode-active Material | Polythiophene Film (Active Material Preparation Example 19) |
| Cathode-active Material | Polythiophene Film (Active Material Preparation Example 19) |
| Electrolytic Solution | $LiClO_4$ (1 M)/Propylene carbonate |
| Results of Evaluation | |
| Open-circuit Voltage Immediately after | 1.6 V |

-continued

| Comparative Battery No. 2 | |
|---|---|
| recharging | |
| One week after recharging | 1.2 V |
| Short-circuit Current | 3.0 mA/cm$^2$ |
| Energy Density | 80 Wh/kg |

COMPARATIVE BATTERY EXAMPLE 3

A comparative organic secondary battery No. 3 was fabricated in the same manner as in Battery Example 1 except the battery elements were changed as shown in the following table and the comparative battery No. 3 was evaluated in the same manner as in Battery Example 1. The results are also shown in the following table:

| Comparative Battery No. 3 | |
|---|---|
| Battery Elements | |
| Anode-active Material | Polyacetylene Film (Active Material Preparation Example 20) |
| Cathode-active Material | Polyacetylene Film (Active Material Preparation Example 20) |
| Electrolytic Solution | LiClO$_4$ (1 M)/Propylene carbonate |
| Results of Evaluation | |
| Open-circuit Voltage Immediately after recharging | 2.7 V |
| One week after recharging | 1.6 V |
| Short-circuit Current | 5.1 mA/cm$^2$ |
| Energy Density | 132 Wh/kg |

The organic secondary batteries Nos. 1 to 4 are more stable in performance and smaller in self-discharge and have higher energy densities as compared with the comparative batteries Nos. 1 to 3.

BATTERY EXAMPLE 5

An anode was prepared by applying to a Ni foil with pressure a polypyrrole film (4 mg/cm$^2$) (serving as an anode-active material) prepared in Active Material Preparation Example 15.

A cathode was prepared by applying to a Ni foil with pressure a benzene polymer film (12 mg/cm) (serving as a cathode-active material) prepared in Active Material Preparation Example 1.

As an electrolytic solution, LiBF$_4$ (1 M) was employed.

A separator was made of a polypropylene carbonate non-woven fabric, an external film was made of a 120 μm thick biaxial drawing polyester film, and a sealing material was made of Chemistat R99 (made by Toray Industries, Inc.

The anode, the cathode, the electrolytic solution, the separator and the sealing material were assembled as shown in FIG. 2, so that an organic secondary battery No. 5 of a thin sheet-type was fabricated. External electrodes (not shown) were constructed by spot-welding Ni-lead wires to Ni foil current collectors (not shown).

The thus fabricated organic secondary battery No. 5 was as good as the organic secondary battery No. 1 with respect to the open-circuit voltage, energy density, short-circuit current and life time.

BATTERY EXAMPLE 6

Battery Example 5 was repeated except the polypyrrole film No. 1 employed in Battery Example 5 was replaced by the polypyrrole film No. 2 prepared in Active Material Preparation Example 16, so that an organic secondary battery No. 6 was fabricated.

The thus fabricated organic secondary battery No. 5 was as good as the organic secondary battery No. 1 with respect to the open-circuit voltage, energy density, short-circuit current and life time.

BATTERY EXAMPLE 7

In the same electrolytic chamber provided with the anode of Nesa glass (30 Ω/cm$^2$) and the cathode of Ni as that employed in Active Material Preparation Example 1, an electrolytic solution of pyrrole (0.1 M) and NaAsF$_6$ (0.2 M) dissolved in acetonitrile was placed. Constant-current electrolysis with 2 mA/cm$^2$ was performed, so that a polypyrrole film having a thickness of about 50 μm was formed on the Nesa glass.

In this electrolytic chamber, a solution of furan (0.05 M) and LiClO$_4$ (0.2 M) dissolved in benzonitrile was placed. Constant-voltage electrolysis with 6.5 V was then performed, so that a polyfuran flim having a thickness of about 35 μm was formed on the polypyrrole film. The layered polypyrrole film and polyfuran film were peeled off the Nesa glass at the same time, so that a composite film consisting of the polypyrrole film and the polyfuran film was prepared.

Figure 4:
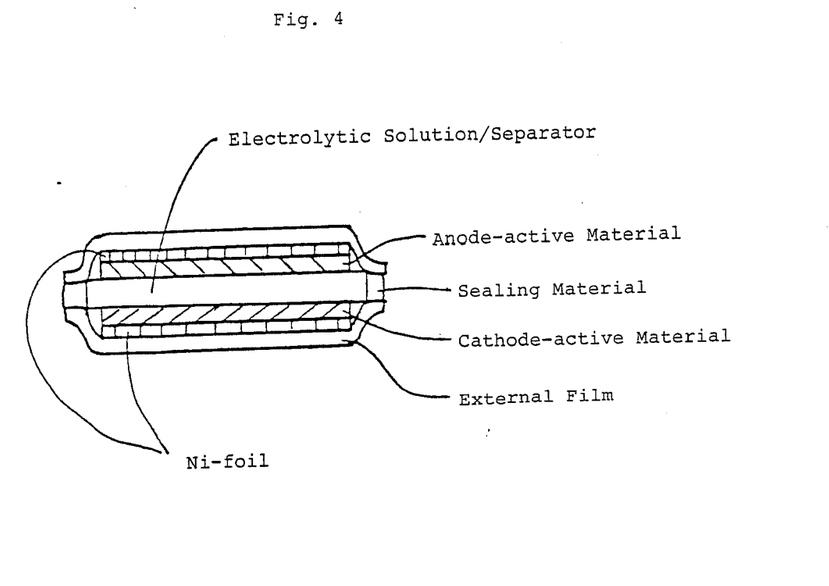
FIG. 4 is a schematic illustration of an organic secondary battery according to the present invention.

The benzene polymer film No. 1 prepared in Active Preparation Example 1 was then applied to the polyfuran film side of the composite film. This was then held between a pair of a nickel plate holders and immersed in an electrolytic solution of LiClO$_4$ (1 M) dissolved in propylene carbonate, whereby an organic secondary battery No. 7 having a structure as shown in FIG. 4 was fabricated. In this battery, the polypryrole film worked as anode-active material, the polyfuran film as separator and the benzene polymer film No. 1 as cathode-active material.

The thus fabricated organic secondary battery No. 7 was as good as the organic secondary battery No. 1 with respect to the open-circuit voltage, energy density, short-circuit current and life time.

BATTERY EXAMPLE 8

In the same electrolytic chamber provided with the anode of Nesa glass (30 Ω/cm$^2$) and the cathode of Ni as that employed in Active Material Preparation Example 1, an electrolytic solution of furan (0.05 M) and AgClO$_4$ (0.2 M) dissolved in benzonitrile was placed. Constant-voltage electrolysis with 4.0 V was performed, so that a polyfuran film having a thickness of about 45 m was formed on the Nesa glass.

An acetylene gas was blown against the surface of a Ziegler-Natta catalyst (Ti(OC$_4$H$_9$)$_4$-Al(C$_2$H$_5$)$_3$) liquid in an atmosphere of argon in accordance with the conventionally known method called "Shirakawa Method" (for example, described in Polymer Journal No. 2,231 (1971)), whereby a polyacetylene film No. 1 with a thickness of about 200 μm was obtained.

On a benzene polymer film No. 2 prepared in Active Material Preparation Example 2, the above prepared polyfuran film and the polyacetylene film were successively applied, so that an organic secondary battery No.

8 according to the present invention was prepared in the same manner as in Battery Example 7 having the structure as shown in FIG. 4. In this battery, the polyacetylene film worked as anode-active material, the polyfuran film as separator and the benzene polymer film No. 2 as cathode-active material.

The thus fabricated organic secondary battery No. 8 was as good as the organic secondary battery No. 1 with respect to the open-circuit voltage, energy density, short-circuit current and life time.

What is claimed is:

1. In an organic secondary battery comprising an anode, a cathode and an electrolytic medium, the improvement wherein said anode comprises an anode-active material and said cathode comprises a cathode-active material, and at least said cathode-active material consists essentially of a benzene polymer produced by electrolytic polymerization.

2. The organic secondary battery as recited in claim 1, wherein said cathode-active material consists essentially of a benzene polymer and said anode-active material consists essentially of polypyrrole.

3. The organic secondary battery as recited in claim 1, further comprising a separator which essentially consists of a polyfuran complex.

4. The organic secondary battery recited in claim 1, wherein said anode-active material is selected from the group consisting of polypyrroles, polythiophenes, benzene polymers, polyazulenes and polymer complexes of said polymeric materials and electrolytic anions.

5. The organic secondary battery as recited in claim 1, wherein said electrolytic medium comprises an electrolyte and a solvent.

6. The organic secondary battery as recited in claim 5, wherein said electrolyte is an electrolytic salt comprising anion dopant and a cation dopant, said anion dopant is selected from the group consisting of halogenated anions of Va-group elements and halogenated anions of IIIa-group elements, and said cation dopant is selected from the group consisting of alkali metal cations and tetraammonium cations.

7. The organic secondary battery as recited in claim 5, wherein said electrolyte is selected from the group consisting of $LiPF_6$, $LiSbF_6$, $LiAsF_6$, $LiClO_4$, $NaClO_4$, $KI$, $KPF_6$, $KSbF_6$, $KAsF_6$, $KClO_4$, $[(n-Bu)_4N]^-\cdot(AsF_6)^-$, $[(n-Bu)_4N]^+\cdot(ClO_4)^-$, $LiAlCl_4$ and $LiBF_4$, where Bu represents a butyl group.

8. The organic secondary battery of claim 4, wherein said anode-active material is selected from the group consisting of polypyrroles and polymer complexes of said polymeric materials and electrolytic anions.

9. The organic secondary battery of claim 4, wherein said anode-active material is selected from the group consisting of polythiophenes and polymer complexes of said polymeric materials and electrolytic anions.

10. The organic secondary battery of claim 4, wherein said anode-active material is selected from the group consisting of benzene polymers and polymer complexes of said polymeric materials and electrolytic anions.

11. The organic secondary battery of claim 4, wherein said anode-active material is selected from the group consisting of polyazulenes and polymer complexes of said polymeric materials and electrolytic anions.

12. The organic secondary battery of claim 6, wherein said anion dopant is selected from the group consisting of halogenated anions of Va-group elements.

13. The organic secondary battery of claim 6, wherein said anion dopant is selected from the group consisting of halogenated anions of IIIa-group elements.

14. The organic secondary battery of claim 6, wherein said cation dopant is selected from the group consisting of alkali metal cations.

15. The organic secondary battery of claim 6, wherein said cation dopant is selected from the group consisting of tetraammonium cations.

16. The organic secondary battery of claim 7, wherein said electrolyte is $LiPF_6$ or $LiSbF_6$.

17. The organic secondary battery of claim 7, wherein said electrolyte is $LiAsF_6$ or $LiClO_4$.

18. The organic secondary battery of claim 7, wherein said electrolyte is $NaClO_4$ or $KI$.

19. The organic secondary battery of claim 7, wherein said electrolyte is $KPF_6$ or $KSbF_6$.

20. The organic secondary battery of claim 7, wherein said electrolyte is $KAsF_6$ or $KClO_4$.

21. The organic secondary battery of claim 7, wherein said electrolyte is $[(n-Bu)_4N^+\cdot(AsF_6)^-$ or $[(n-Bu)_4N]^+\cdot(ClO_4^-$, where Bu is a butyl group.

22. The organic secondary battery of claim 7, wherein said electrolyte is $LiAlCL$ or $LiBF_4$.

* * * * *

UNITED STATES PATENT AND TRADEMARK OFFICE
CERTIFICATE OF CORRECTION

PATENT NO. : 4,935,319

DATED : June 19, 1990

INVENTOR(S) : OHSAWA et al

It is certified that error appears in the above-identified patent and that said Letters Patent is hereby corrected as shown below:

Column 1, line 66, "secondary batttery" should read

--secondary battery--

Column 2, line 53, "$SbC_6$-" should read --$SbCl_6^-$;-- line 59, "atoms)" should read --atoms).--

Column 3, line 4, "componds" should read --compounds--

Column 4, line 26, "Ness" should read --Nesa-- line 37, after "of" (second occurance) insert

--Ni as that--

Column 5, line 19, delete "with"

line 33, "$LiCl_4$," should read --$LiClO_4$,-- line 36, "prefe able in" should read --preferable for-- line 52, "elecrtrolysis" should read --electrolysis--

Column 6, line 30, "5 ma/$cm^2$" should read

--5 Ma/$cm^2$--

Column 7, line 38, "$Co(NH_3)_3)_2(NO_2)_3$, should read

--$Co(NH_3)_2(NO_2)_3$,--

UNITED STATES PATENT AND TRADEMARK OFFICE
CERTIFICATE OF CORRECTION

PATENT NO. : 4,935,319

DATED : June 19, 1990

INVENTOR(S) : OHSAWA et al

It is certified that error appears in the above-identified patent and that said Letters Patent is hereby corrected as shown below:

Column 7, line 42, "to use a" should read

--to use as a-- line 45, "diphenly" should read --diphenyl-- line 60, "KsbF$_6$," should read --KSbF$_6$,--

Column 8, line 5, "doner" should read --donor-- line 22, "elecrtrolysis" should read --electrolysis-- line 43, "H and S$_3$" should read --H$_2$SO$_4$ and S$_3$-- line 57, "nitrobenezene" should read --nitrobenzene--

Column 9, line 8, "[Bu4N]" should read

--[Bu$_4$N]-- line 17, "Ω" should read --σ-- line 26, "(PPh$_3$)2" should read --(PPh$_3$)$_2$-- line 27, "nitrobenezene" should read --nitrobenzene-- line 31, "Ω" should read --σ-- line 41, "nitrobenezene" should read --nitrobenzene-- line 46, " Ω" should read -- σ--

UNITED STATES PATENT AND TRADEMARK OFFICE
CERTIFICATE OF CORRECTION

PATENT NO. : 4,935,319

DATED : June 19, 1990

INVENTOR(S) : OHSAWA et al

Page 3 of 4

It is certified that error appears in the above-identified patent and that said Letters Patent is hereby corrected as shown below:

Column 9, line 55, "[Bu4N]BF$_4$" should read

--[Bu$_4$N] BF$_4$-- line 56, "nitrobenezene" should read

--nitrobenzene-- line 60, "$\Omega$" should read --$\sigma$--

Column 10, line 6, "

line 21, "$\Omega$" should read -- $\sigma$-- line 64, after "such as" insert --Na$^+$-- line 68, "mononer" should read --monomer--

Column 11, line 6, "polyryrrole" should read

--polypyrrole-- line 9, "monomenr" should read --monomer-- line 67, "2.5 mA/cm" should read --2.5 mA/cm$^2$)--

Column 14, line 29, "Inc." should read --Inc.)-- line 39, "electrode" should read --electrodes--

Column 17, line 51, "12 mg/cm)" should read

--12 mg/cm$^2$)--

UNITED STATES PATENT AND TRADEMARK OFFICE
CERTIFICATE OF CORRECTION

PATENT NO. : 4,935,319

DATED : June 19, 1990

INVENTOR(S) : OHSAWA et al

It is certified that error appears in the above-identified patent and that said Letters Patent is hereby corrected as shown below:

Column 17, line 60, "Inc." should read --Inc.)--

Column 18, line 10, "No. 5" should read --No. 6-- line 25, "$LiCl_{04}$" should read --$LiClO_4$-- line 27, "flim" should read "film"

line 36, "of a nickel" should read --of nickel-- line 40, "polypryole" should read --polypyrrole-- line 56, "45 m" should read --45 mm--

Column 19, line 45, "$[(N-Bu)_4N]^-$" should read --$[(N-Bu)_4N]^+$--

Column 20, line 44, "$(ClO_4^-$" should read --$(ClO_4)^-$-- line 46, "LiAlCL" should read --$LiAlCl_4$--

Signed and Sealed this

Twenty-ninth Day of September, 1992

Attest:

DOUGLAS B. COMER

Attesting Officer        Acting Commissioner of Patents and Trademarks